US012759085B2

(12) United States Patent
Seo et al.

(10) Patent No.: US 12,759,085 B2
(45) Date of Patent: Oct. 13, 2026

(54) CUTTING METHOD OF MOTHER SUBSTRATE FOR DISPLAY PANEL USING A LASER

(71) Applicant: SAMSUNG DISPLAY CO., LTD., Yongin-si (KR)

(72) Inventors: Jeongweon Seo, Hwaseong-si (KR); Woohyun Jung, Seoul (KR); Hyun-Hyang Kim, Suwon-si (KR); Eunje Jang, Hwaseong-si (KR); Min-Gwan Hyun, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 798 days.

(21) Appl. No.: 17/715,210

(22) Filed: Apr. 7, 2022

(65) Prior Publication Data

US 2022/0324059 A1 Oct. 13, 2022

(30) Foreign Application Priority Data

Apr. 8, 2021 (KR) ........................ 10-2021-0045671

(51) Int. Cl.
*B23K 26/402* (2014.01)
*B23K 26/38* (2014.01)
(Continued)

(52) U.S. Cl.
CPC ............ *B23K 26/402* (2013.01); *B23K 26/38* (2013.01); *C03B 33/0222* (2013.01); *B23K 2103/42* (2018.08); *B23K 2103/54* (2018.08)

(58) Field of Classification Search
CPC .. B26B 1/02; B23K 2103/42; B23K 2103/54; B23K 26/0624; B23K 26/364;
(Continued)

(56) References Cited

U.S. PATENT DOCUMENTS 6,236,446 B1 5/2001 Izumi et al.
6,489,588 B1 12/2002 Hoekstra et al.
(Continued)

FOREIGN PATENT DOCUMENTS

JP 2008-174395 7/2008
KR 10-1999-0030087 A 4/1999
(Continued)

OTHER PUBLICATIONS

Office Action dated Nov. 22, 2024 from the Korean Intellectual Property Office (KIPO) issued in corresponding Korean Patent Application No. 10-2021-0045671.
(Continued)

*Primary Examiner* — Woody A Lee, Jr.
*Assistant Examiner* — Adam M Eckardt
(74) *Attorney, Agent, or Firm* — F. CHAU & ASSOCIATES, LLC

(57) ABSTRACT

A cutting method of a mother substrate includes: irradiating a laser to the mother substrate at first intervals along a first cutting line overlapping dummy areas positioned adjacent to sides of each of display panel areas on the mother substrate; and irradiating the laser to the mother substrate at second intervals different from the first intervals along the first cutting line overlapping edge areas positioned adjacent to corner portions of each of the display panel areas.

16 Claims, 6 Drawing Sheets

(51) Int. Cl.
*B23K 103/00* (2006.01)
*C03B 33/02* (2006.01)

(58) Field of Classification Search
CPC .... B23K 26/38; B23K 26/382; B23K 26/402; B23K 2103/50; B23K 26/40; B23K 26/0736; B23K 26/1423; B23K 26/1435; B23K 26/146; B23K 26/1462; B23K 26/1476; B23K 2101/40; B23K 2103/56; B23K 26/0006; B23K 26/354; B23K 26/359; C03B 33/0222; C03B 33/091; C03B 33/033; C03B 33/093; C03B 33/102; Y02P 40/57; Y02P 20/55; Y10T 225/304; Y10T 225/12; Y10T 225/307; A61P 1/10; A61P 1/12; A61P 11/14; A61P 25/04; A61P 25/20; A61P 25/24; A61P 25/30; A61P 25/36; C07D 489/08; G01F 1/8427; G01F 25/10; H01F 17/0013; H01F 2017/002; H01F 2017/0073; H01F 27/292; H01F 41/042; G02F 1/133351; G02F 1/13336; H03H 7/40; H03H 7/38; H10K 59/18; H10K 71/851
See application file for complete search history.

(56) References Cited

U.S. PATENT DOCUMENTS

| | | | | |
|---|---|---|---|---|
| 6,660,963 | B2 | 12/2003 | Hoekstra et al. | |
| 2003/0024909 | A1 | 2/2003 | Hoekstra et al. | |
| 2015/0191388 | A1 * | 7/2015 | Abramov | C03B 33/091 65/161 |
| 2016/0280580 | A1 * | 9/2016 | Bohme | C03B 33/091 |
| 2018/0133842 | A1 * | 5/2018 | Jeong | B23K 26/402 |
| 2019/0094583 | A1 | 3/2019 | Moon et al. | |

FOREIGN PATENT DOCUMENTS

| | | | |
|---|---|---|---|
| KR | 10-2000-0050913 | A | 8/2000 |
| KR | 10-2001-0054662 | A | 7/2001 |
| KR | 10-2001-0063794 | | 7/2001 |
| KR | 10-2001-0063794 | A | 7/2001 |
| KR | 10-2001-0095501 | A | 11/2001 |
| KR | 10-2012-0010109 | A | 2/2012 |
| KR | 10-1476919 | B1 | 12/2014 |
| KR | 10-2017-0010743 | A | 2/2017 |

OTHER PUBLICATIONS

Office Action dated Mar. 24, 2026 from the Chinese Patent Office for corresponding Chinese Patent Application No. 202210355926.7.

* cited by examiner

CUTTING METHOD OF MOTHER SUBSTRATE FOR DISPLAY PANEL USING A LASER

CROSS-REFERENCE TO RELATED APPLICATION

This application claims priority under 35 USC § 119 to Korean Patent Application No. 10-2021-0045671, filed on Apr. 8, 2021, the disclosure of which is incorporated by reference herein in its entirety.

TECHNICAL FIELD

Embodiments of the present invention relate to a cutting method of a mother substrate for a display panel. More particularly, embodiments of the present invention relate to a cutting method of a mother substrate for a display panel using a laser.

DISCUSSION OF THE RELATED ART

In general, a display panel may not be manufactured as a single unit. To increase productivity, a mother panel having a size several times to several hundreds of times the size ofa final display panel may be formed, and by separating the mother panel into each of the display panel units, a plurality of display panels may be manufactured.

In addition, typically, a laser may be used to separate the completed display panel from the mother panel. However, by irradiating the laser, a surface of a substrate cut by the laser may not be smooth.

SUMMARY

According to an embodiment of the present invention, a cutting method of a mother substrate includes: irradiating a laser to the mother substrate at first intervals along a first cutting line overlapping dummy areas positioned adjacent to sides of each of display panel areas on the mother substrate; and irradiating the laser to the mother substrate at second intervals different from the first intervals along the first cutting line overlapping edge areas positioned adjacent to corner portions of each of the display panel areas.

In an embodiment of the present invention, a size of each of the second intervals is less than a size of each of the first intervals.

In an embodiment of the present invention, the cutting method further includes: irradiating the laser to the mother substrate at the first intervals along a second cutting line overlapping the dummy areas; and irradiating the laser to the mother substrate at the second intervals along the second cutting line overlapping the edge areas.

In an embodiment of the present invention, the dummy areas and the edge areas are alternately arranged along a first direction and a second direction crossing the first direction.

In an embodiment of the present invention, the first cutting line extends in a first direction, and the second cutting line extends in a second direction crossing the first direction.

In an embodiment of the present invention, as the laser is irradiated to the first cutting line and the second cutting line, a size of each of the first intervals is substantially constant and a size of each of the second intervals is gradually reduced.

In an embodiment of the present invention, a speed at which a size of each of the second intervals decreases as the laser is irradiated to the second cutting line is a same as a speed at which a size of each of the second intervals decreases as the laser is irradiated to the first cutting line.

In an embodiment of the present invention, a speed at which a size of each of the second intervals decreases as the laser is irradiated to the second cutting line is different from a speed at which a size of each of the second intervals decreases as the laser is irradiated to the first cutting line.

In an embodiment of the present invention, output energy of the laser emitted to the edge areas is less than output energy of the laser emitted to the dummy areas.

In an embodiment of the present invention, as the laser is irradiated to the first cutting line and the second cutting line, output energy of the laser irradiated to the dummy areas is substantially constant and output energy of the laser irradiated to the edge areas is gradually reduced.

In an embodiment of the present invention, the mother substrate includes a glass substrate or a plastic substrate.

In an embodiment of the present invention, the display panel includes a driving circuit and an emission circuit, and is disposed in each of the display panel areas.

In an embodiment of the present invention, the laser is a pulse laser.

In an embodiment of the present invention, the laser is a picosecond laser or a femtosecond laser.

In an embodiment of the present invention, the cutting method further includes: irradiating the laser to the mother substrate at the first intervals along a second cutting line overlapping the dummy areas; and irradiating the laser to the mother substrate at the first intervals along the second cutting line overlapping the edge areas.

In an embodiment of the present invention, as the laser is irradiated to the first cutting line, output energy of the laser irradiated to the edge areas is gradually decreased, and wherein as the laser is irradiated to the second cutting line, output energy of the laser irradiated to the dummy areas and the edge areas is substantially constant.

In an embodiment of the present invention, as the laser is irradiated to the first cutting line and the second cutting line, a size of each of the first intervals is substantially constant and a size of the second intervals is gradually reduced.

According to an embodiment of the present invention, a cutting method of a mother substrate for a display panel includes: irradiating a laser to the mother substrate at second intervals along a first cutting line overlapping edge areas positioned adjacent to corner portions of each of display panel areas on the mother substrate; and irradiating the laser to the mother substrate at first intervals, different from the second intervals, or at the second intervals along a second cutting line overlapping the edge areas, wherein the first cutting line extends in a first direction, and the second cutting line extends in a second direction crossing the first direction.

In an embodiment of the present invention, the cutting method further includes: irradiating a laser to the mother substrate at the first intervals along the first cutting line overlapping dummy areas positioned adjacent to sides of each of display panel areas on the mother substrate; and irradiating the laser to the mother substrate at the first intervals along the second cutting line overlapping the dummy areas.

In an embodiment of the present invention, a size of each of the second intervals is less than a size of each of the first intervals.

BRIEF DESCRIPTION OF THE DRAWINGS

The above and other features of the present invention will become more apparent by describing in detail embodiments thereof, with reference to the accompanying drawings, in which.

DETAILED DESCRIPTION OF THE EMBODIMENTS

Figure 1:
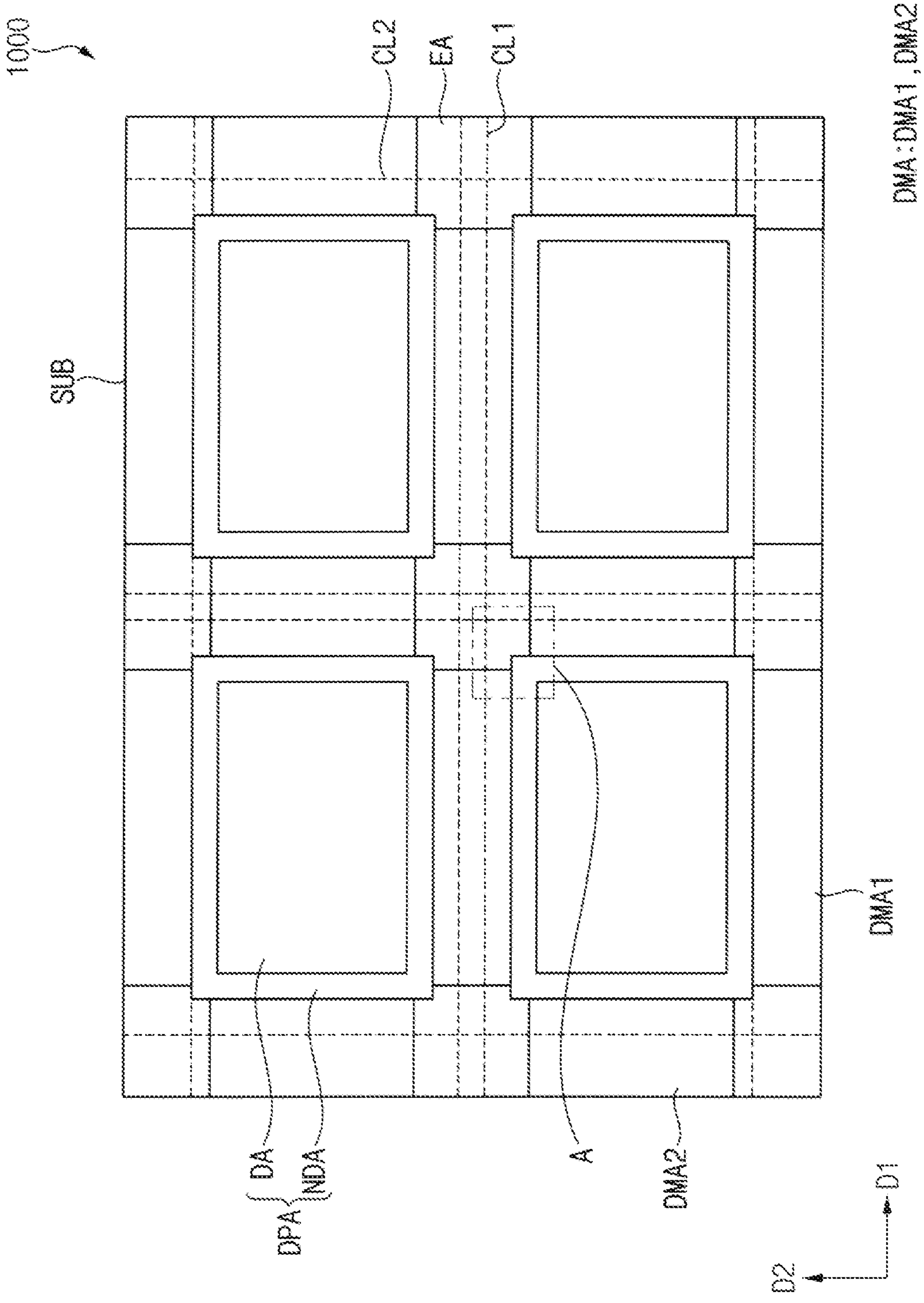
FIG. 1 is a plan view illustrating a mother panel for manufacturing a display panel according to an embodiment of the present invention.

Hereinafter, embodiments of the present invention will be explained in detail with reference to the accompanying drawings. The same reference numerals may be used for the same components in the drawings, and redundant descriptions of the same components may be omitted.

FIG. 1 is a plan view illustrating a mother panel for manufacturing a display panel according to an embodiment of the present invention.

Referring to FIG. 1, the mother panel 1000 for the display panel may include a mother substrate SUB for the display panel. Hereinafter, the mother substrate SUB for a display panel will be referred to as the mother substrate SUB.

The mother substrate SUB may include display panel areas DPA, dummy areas DMA, and edge areas EA. In an embodiment of the present invention, the dummy areas DMA may be positioned adjacent to sides of each of the display panel areas DPA, and the edge areas EA may be positioned adjacent to corners of each of the display panel areas DPA.

The dummy areas DMA may include first dummy area DMA1 and a second dummy area DMA2. The first dummy area DMA1 may be adjacent to a first side of each of the display panel areas DPA, and the second dummy area DMA2 may be adjacent to a second side of each of the display panel areas DPA. For example, two first dummy areas DMA1, two second dummy area DMA2, and four edge areas EA may be adjacent to each of the display panel areas DPA. For example, the first and second dummy areas DMA1 and DMA2 may be adjacent to the edge area EA. For example, the edge area EA may be between the first dummy area DMA1 and the second dummy area DMA2. In an embodiment of the present invention, the dummy areas DMA and the edge areas EA may be alternately arranged along a first direction D1 and a second direction D2 crossing the first direction D1.

The mother substrate SUB may be cut by using a laser to separate the display panel areas DPA, the dummy areas DMA, and the edge areas EA. For example, the display panel areas DPA may include first to fourth display panel areas. However, the configuration of the present invention is not limited thereto, and the display panel areas DPA may include several to hundreds of display panel areas.

Each of the display panel areas DPA may have a polygonal shape. For example, each of the display panel areas DPA may have a square shape. However, the shape of each of the display panel areas DPA is not limited thereto. For example, each of the display panel areas DPA may have a square shape with rounded corners.

First cutting lines CL1 and second cutting lines CL2 may be provided on the mother substrate SUB, and the laser may be irradiated to the first and second cutting lines CL1 and CL2 of the mother substrate SUB. In an embodiment of the present invention, the first cutting lines CL1 may extend in the first direction D1, and the second cutting lines CL2 may extend in the second direction D2 crossing the first direction D1. For example, some of the first cutting lines CL1 may overlap the first dummy areas DMA1, and some of the first cutting lines CL1 may overlap a boundary between the display panel areas DPA and the first dummy area DMA1. In addition, the second cutting lines CL2 may overlap the second dummy area DMA2. In the edge areas EA, the first cutting lines CL1 and the second cutting lines CL2 may cross each other.

A finally commercialized display device may include a display panel and an external device for driving the display panel. Each of the display panel areas DPA may correspond to the display panel. For example, the display panel may include a driving circuit for driving the display device and an emission circuit emitting light. Each of the display panel areas DPA may include a display area DA and a non-display area NDA. In the display area DA, the display device displays an image, and in the non-display area NDA the external device is mounted. The dummy areas DMA and the edge areas EA may be portions that are not substantially commercialized.

In an embodiment of the present invention, the mother substrate SUB may include, for example, a glass substrate, a quartz substrate, a plastic substrate, and the like. For example, when the mother substrate SUB includes a plastic substrate, the mother substrate SUB may include a variety of materials having flexible, foldable, bendable, rollable, or stretchable properties. For example, the mother substrate SUB may include an organic material. For example, the mother substrate SUB may include at least one of polyimide ("P"), polyethersulphone ("PES"), polyacrylate ("PAR"), polyetherimide ("PEI"), polyethylene naphthalate ("PEI"), polyethylene napthalate ("PEN"), polyethylene terepthalate ("PET"), polyphenylene sulfide ("PPS"), polyarylate ("PAR"), polycarbonate ("PC"), and/or cellulose acetate propionate ("CAP").

For example, the mother substrate SUB may have a multilayer structure including two organic layers, which include the organic material, and two barrier layers disposed between the two organic layers and including an inorganic material. For example, the two organic layers and the two barrier layers may be alternatively arranged. Accordingly, the mother substrate SUB may have a single-layer structure or a multi-layer structure.

Figure 2:
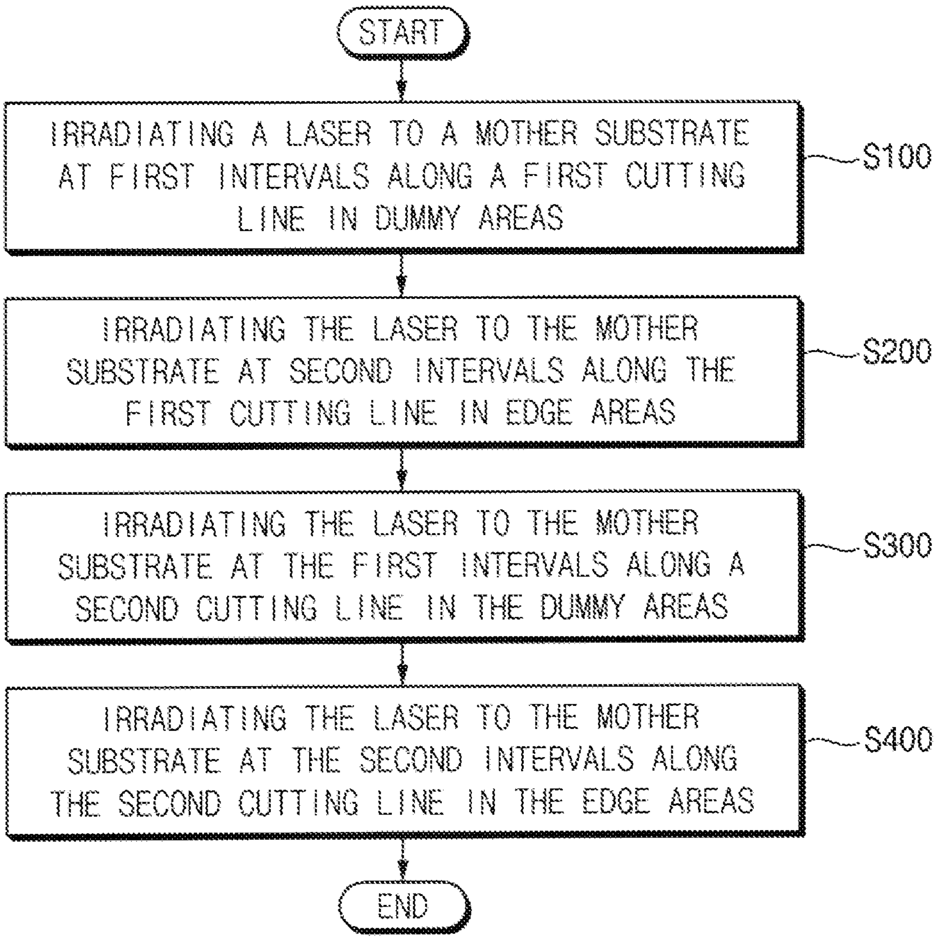
FIG. 2 is a flowchart illustrating an example of a method of cutting a mother substrate for the display panel of FIG. 1.
Figure 3:
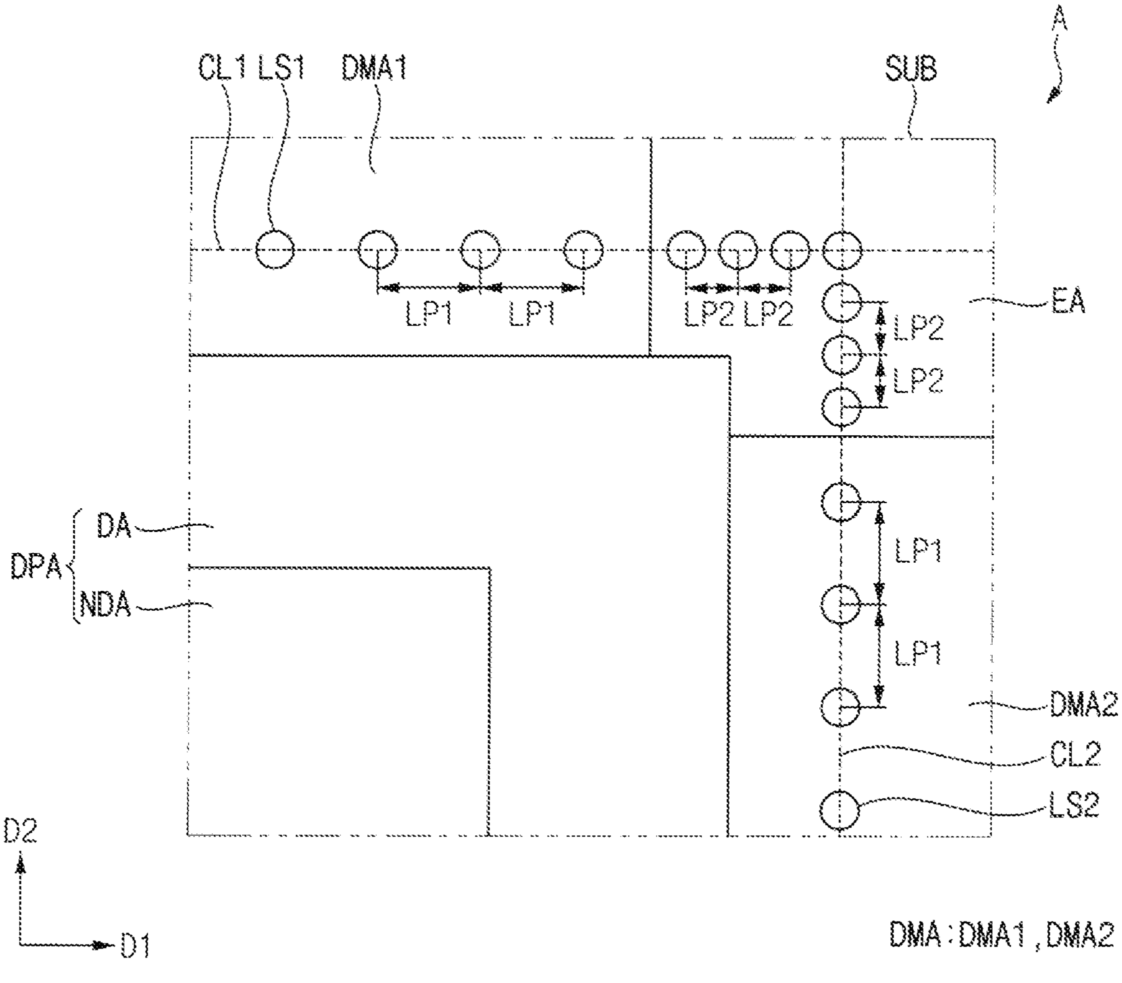
FIG. 3 is a plan view illustrating an enlarged area 'A' of FIG. 1.

FIG. 2 is a flowchart illustrating an example of a method of cutting a mother substrate for the display panel of FIG. 1. FIG. 3 is a plan view illustrating an enlarged area 'A' of FIG. 1. For example, FIG. 3 is a plan view of an enlarged a portion of the mother panel 1000 for the display panel of FIG. 1 to explain the cutting method of the mother substrate for the display panel of FIG. 2.

Referring to FIG. 2, the cutting method of the mother substrate for the display panel may include irradiating a laser to the mother substrate SUB at first intervals LP1 along the first cutting line CL1 in the dummy areas DMA (S100). The method may further include irradiating a laser to the mother substrate SUB at second intervals LP2 along the first cutting line CL1 in the edge areas EA (S200). The method additionally includes irradiating a laser to the mother substrate SUB at first intervals LP1 along the second cutting line CL2 in the dummy areas DMA (S300), and irradiating a laser to the mother substrate SUB at second intervals LP2 along the second cutting line CL2 in the edge areas EA (S400). Hereinafter, the cutting method of the mother substrate for the display panel will be described in detail.

First, referring to FIGS. 1 to 3, the laser may be irradiated to the mother substrate SUB at the first intervals LP1 along the first cutting line CL1 overlapping the first dummy areas DMA1. Thereafter, the laser may be irradiated to the mother substrate SUB at the second intervals LP2 different from the first intervals LP1 along the first cutting line CL1 overlapping the edge areas EA. By repeating the above process, the laser may be irradiated to the mother substrate SUB along the four first cutting lines CL1 overlapping the first dummy areas DMA1 and the edge areas EA.

Next, the laser may be irradiated to the mother substrate SUB at the first intervals LP1 along the second cutting line CL2 overlapping the second dummy areas DMA2. Thereafter, the laser may be irradiated to the mother substrate SUB at the second intervals LP2 different from the first intervals LP1 along the second cutting line CL2 overlapping the edge areas EA. By repeating the above process, the laser may be irradiated to the mother substrate SUB along the four second cutting lines CL2 overlapping the second dummy areas DMA2 and the edge areas EA.

In an embodiment of the present invention, a size of each of the second intervals LP2 may be less than a size of each of the first intervals LP1. For example, the size of each of the first intervals LP1 may be about 5 μm, and the size of each of the second intervals LP2 may be about 3 μm.

The laser having first focal points LS1 may be irradiated to the mother substrate SUB along the first cutting lines CL1 overlapping the first dummy areas DMA1 and the edge areas EA. In addition, the laser having second focal points LS2 may be irradiated to the mother substrate SUB along the second cutting lines CL2 overlapping the second dummy areas DMA2 and the edge areas EA. For example, the first focal points LS1 in the first dummy areas DMA1 are spaced apart from each other by the first interval LP1, and the second focal points LS2 in the second dummy areas DMA2 may be spaced apart from each other by the first interval LP1. For example, the first focal points LS1 in the edge areas EA may be spaced apart from each other by the second interval LP2, and the second focal points LS2 in the edge areas EA may be spaced apart from each other by the second interval LP2. However, the present invention is not limited thereto.

In an embodiment of the present invention, as the laser is irradiated to the first and second cutting lines CL1 and CL2, the size of each of the first intervals LP1 may be substantially constant, and the size of each of the second intervals LP2 may gradually decrease. For example, the size of each of the second intervals LP2 may gradually decrease in the first direction D1 along the first cutting line CL1 and in the second direction D2 along the second cutting line CL2. For example, the size of each of the second intervals LP2 may gradually decrease as the intersection between the first cutting line CL1 and the second cutting line CL2 is approached; however, the present invention is not limited thereto. In addition, a speed at which a size of each of the second intervals LP2 decreases as the laser is irradiated to the second cutting line CL2 may be substantially the same as a speed at which a size of each of the second intervals LP2 decreases as the laser is irradiated to the first cutting line CL1. For example, as the laser is irradiated to the first and second cutting lines CL1 and CL2, the size of each of the first intervals LP1 may be substantially constant to about 5 μm, and the size of each of the second intervals LP2 may be gradually reduced to about 3 μm or less. For example, the size of each of the second intervals LP2 may be gradually reduced in the second direction D2. For example, the size of each of the second intervals LP2 may be adjusted by adjusting a moving speed of a stage supporting the mother substrate SUB or a moving speed of a laser irradiation device for outputting the laser. However, the present invention is not limited thereto, and for example, the size of each of the second intervals LP2 may be substantially constant and may be smaller than the first intervals LP1.

In an embodiment of the present invention, the speed at which the size of each of the second intervals LP2 decreases as the laser is irradiated to the second cutting lines CL2 may be different from the speed at which the size of each of the second intervals LP2 decreases as the laser is irradiated to the first cutting lines CL1. For example, the speed at which the size of each of the second intervals LP2 decreases as the laser is irradiated to the second cutting lines CL2 may be greater than the speed at which the size of each of the second intervals LP2 decreases as the laser is irradiated to the first cutting lines CL1. However, the present invention is not limited thereto.

In an embodiment of the present invention, the laser may be a pulse laser. For example, when the laser is the pulse laser, the laser may be a picosecond laser. In addition, the laser may be a femtosecond laser, as an example.

As an irradiation interval of the laser decreases, a thermal effect applied to the mother substrate SUB by the laser may increase. For example, the thermal effect applied to the mother substrate SUB by the laser in the edge areas EA may increase. In other words, the thermal energy, applied from the laser, in the edge areas EA of the mother substrate SUB may be greater than the thermal energy, applied from the laser, in the dummy areas DMA of the mother substrate SUB. In this case, the mother substrate SUB might not be smoothly cut in the edge areas EA.

The output energy of the laser emitted to the edge areas EA may be less than the output energy of the laser emitted to the dummy areas DMA. In an embodiment of the present invention, the output energy of the laser to the dummy areas DMA may be substantially constant, and the output energy of the laser in the edge areas EA may gradually decrease. For example, as the laser is irradiated to the first and second cutting lines CL1 and CL2 in the edge areas EA, the output energy of the laser may be gradually decreased. For example, in the edge areas EA, the output energy of the laser may be gradually reduced in the first direction D1 along the first cutting line CL1 and in the second direction D2 along the second cutting line CL2. For example, the output energy of the laser may be gradually reduced as the intersection between the first and second cutting lines CL1 and CL2 is approached. Accordingly, the thermal effect applied to the edge areas EA of the mother substrate SUB by the laser may be reduced, and the mother substrate SUB may be smoothly cut.

Conventionally, to manufacture a display panel using a mother panel for a display panel, a laser is irradiated to a mother substrate at regular intervals. However, when the laser is irradiated to the mother substrate at regular intervals, the mother substrate adjacent to an edge of the display panel might not be smoothly cut.

In the cutting method of the mother substrate for the display panel according to an embodiment of the present invention, the laser may be irradiated to the mother substrate SUB at the first intervals LP1 along the first and second cutting lines CL1 and CL2 overlapping the dummy areas DMA, and the laser may be irradiated to the mother substrate SUB at the second intervals LP2 different from the first intervals LP1 along the first and second cutting lines CL1 and CL2 overlapping the edge areas EA. Accordingly, the mother substrate SUB overlapping the edge areas EA may be smoothly cut using the laser.

Figure 4:
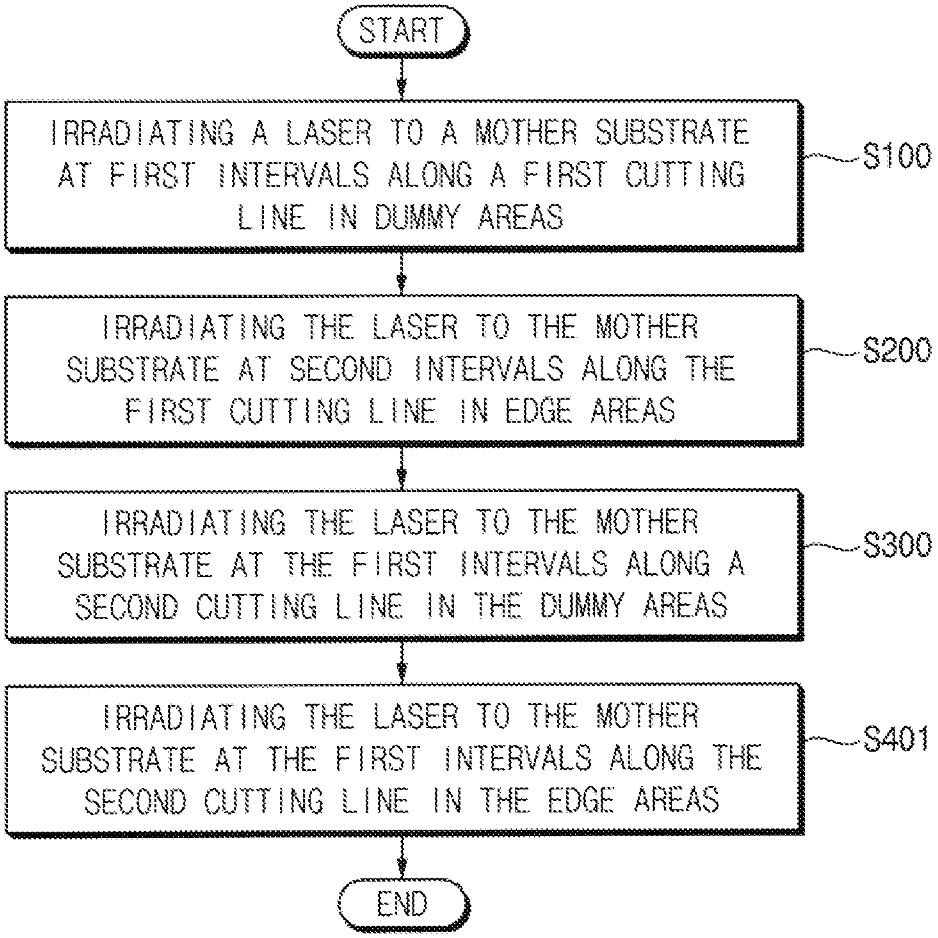
FIG. 4 is a flowchart illustrating an example of a method of cutting a mother substrate for the display panel of FIG. 1.
Figure 5:
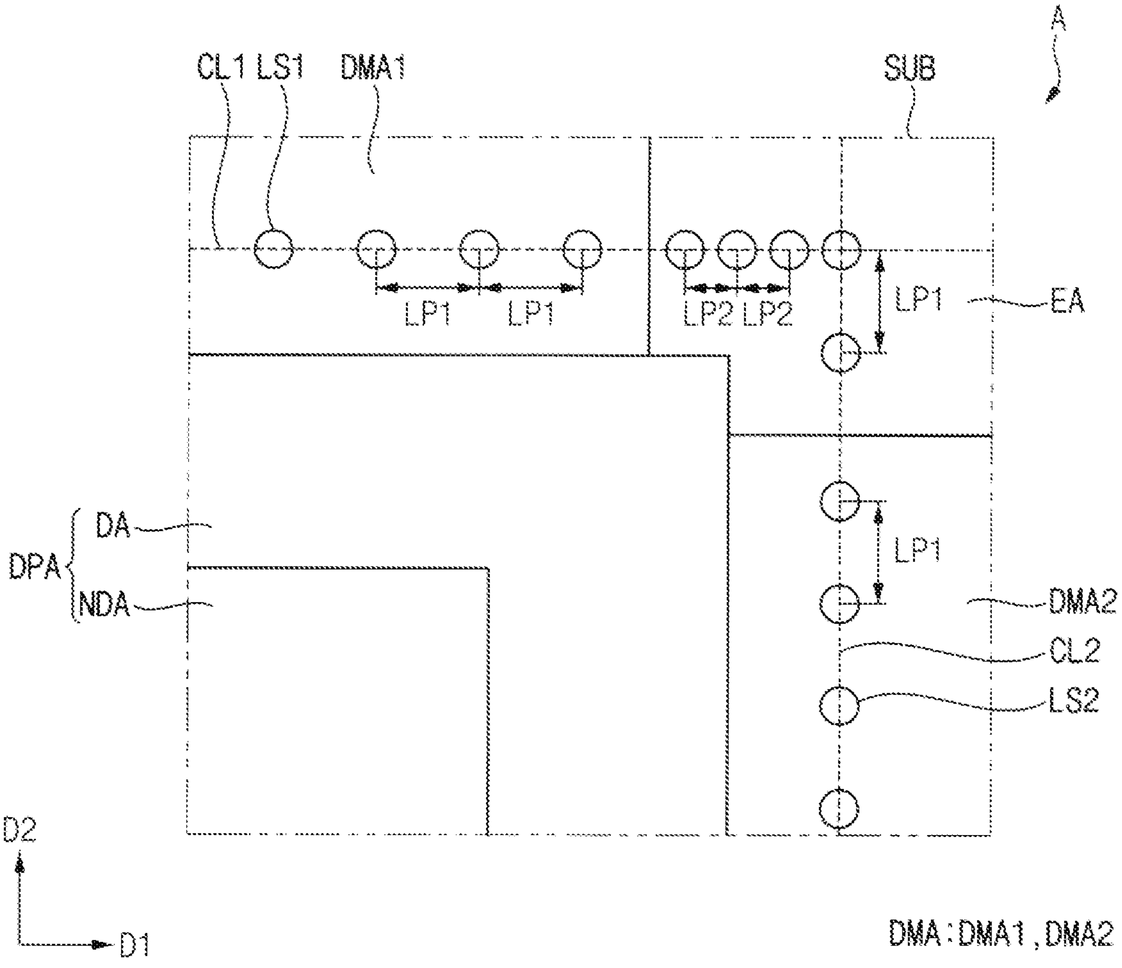
FIG. 5 is a plan view illustrating a mother panel for manufacturing a display panel according to an embodiment of the present invention.

FIG. 4 is a flowchart illustrating example of a method of cutting a mother substrate for the display panel of FIG. 1. FIG. 5 is a plan view illustrating a mother panel for manufacturing a display panel according to an embodiment of the present invention.

For example, FIG. 5 is a plan view illustrating an enlarged a portion of the mother panel 1000 for the display panel of FIG. 1 to illustrate the cutting method, of FIG. 4, of the mother substrate for the display panel. For example, FIG. 5 is a plan view illustrating an enlarged area 'A' of FIG. 1.

Referring to FIGS. 1 and 5, the cutting method of the mother substrate for the display panel may include irradiating a laser to the mother substrate SUB at first intervals LP1 along the first cutting line CL1 in the dummy areas DMA (S100). The method further includes irradiating a laser to the mother substrate SUB at second intervals LP2 along the first cutting line CL1 in the edge areas EA (S200). The method additionally includes irradiating a laser to the mother substrate SUB at first intervals LP1 along the second cutting line CL2 in the dummy areas DMA (S300), and irradiating a laser to the mother substrate SUB at the same intervals as the first intervals LP1 along the second cutting line CL2 in the edge areas EA (S401). However, the cutting method of the mother substrate for a display panel described with reference to FIGS. 4 and 5 may be substantially the same as or similar to the cutting method of the mother substrate for a display panel described with reference to FIGS. 2 and 3 except for irradiating a laser to the mother substrate SUB at the same intervals as the first intervals LP1 along the second cutting line CL2 in the edge areas EA (S401). Hereinafter, overlapping descriptions will be omitted.

In an embodiment of the present invention, the laser may be irradiated to the mother substrate SUB at first intervals LP1 along the second cutting line CL2 overlapping the second dummy areas DMA2. Thereafter, the laser may be irradiated to the mother substrate SUB at the same intervals as the first intervals LP1 along the second cutting line CL2 overlapping the edge areas EA. For example, by repeating the above process, the laser may be irradiated to the mother substrate SUB at the first intervals LP1 along the four second cutting lines CL2 overlapping the second dummy areas DMA2 and the edge areas EA.

In the first dummy areas DMA1, the first focal points LS1 may be spaced apart from each other by the first interval LP1, and in the second dummy areas DMA2, the second focal points LS2 may be spaced apart from each other by the first interval LP1. In addition, in the edge areas EA, the first focal points LS1 may be spaced apart from each other by the second interval LP2, and the second focal points LS2 may be spaced apart from each other by the first interval LP1.

As described above, as the laser is irradiated to the first cutting line CL1, the output energy of the laser to the dummy areas DMA may be substantially constant and the output energy of the laser to the edge areas EA may be gradually decrease. In an embodiment of the present invention, as the laser is irradiated to the second cutting line CL2, the output energy of the laser in the dummy areas DMA may be substantially constant and the output energy of the laser in the edge areas EA may be substantially constant.

Figure 6:
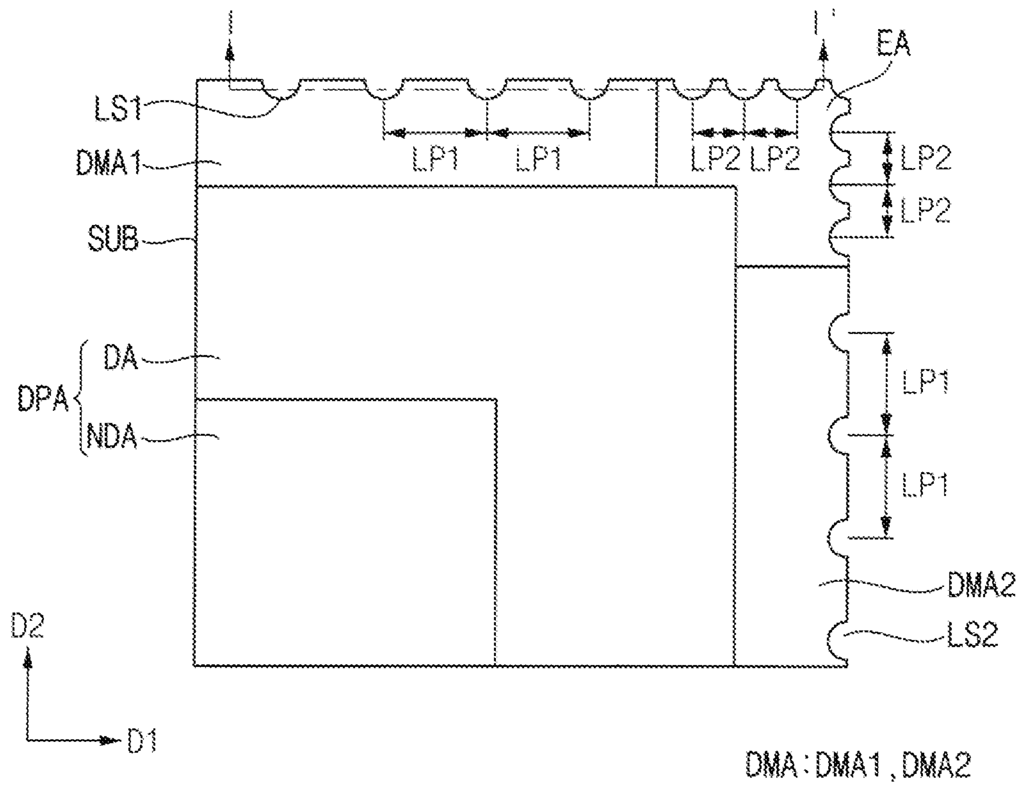
FIG. 6 is a plan view illustrating a portion of the mother substrate for the display panel of FIG. 3 that is cut using a laser.

Referring to FIG. 6, for example, FIG. 6 is a plan view illustrating that the mother substrate SUB is cut using the laser along first and second cutting lines CL1 and CL2 through the cutting method of the mother substrate for the display panel of FIGS. 2 and 3. In addition, a portion of the mother substrate SUB overlapping the dummy areas DMA and the edge areas EA is cut by using the laser along the first and second cutting lines CL1 and CL2, and a remaining portion of the mother substrate SUB overlapping the dummy areas DMA and the edge areas EA may be cut by using the laser along the boundary between the dummy areas DMA and the display panel areas DPA. In addition, grooves formed by the first and second focal points LS1 and LS2 to which the laser is irradiated may be removed through a subsequent process. As a result, the mother substrate SUB overlapping the dummy areas DMA and the edge areas EA may not remain.

Figure 7:
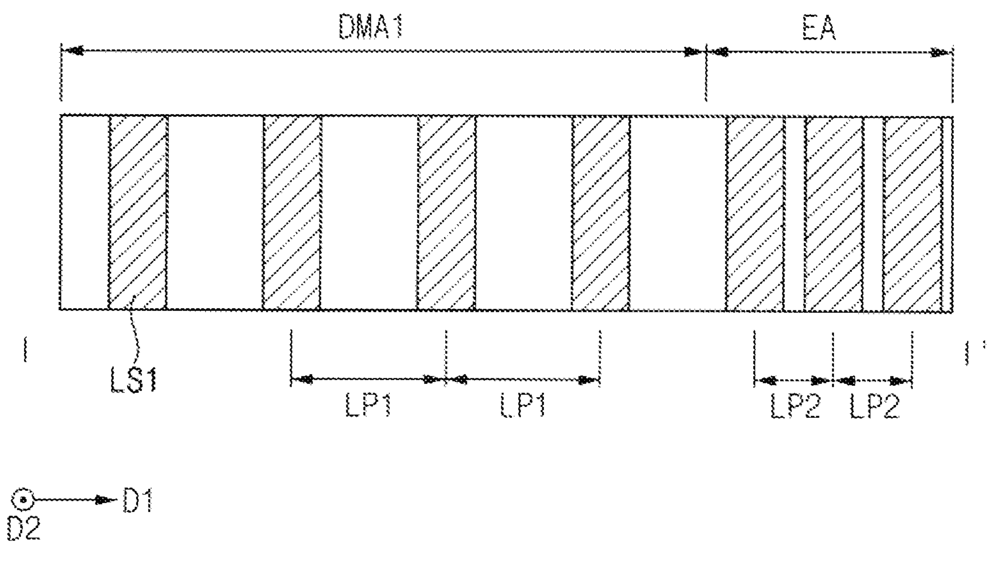
FIG. 7 is a cross-sectional view taken along line I-I' of FIG. 6.

Referring to FIG. 7, FIG. 7 is a cross-sectional view illustrating a cut surface of the mother substrate SUB after cutting the mother substrate SUB by irradiating the laser along the first and second cutting lines CL1 and CL2 overlapping the dummy areas DMA and the edge areas EA. For example, in the cross-sectional view, each of the first focal points LS1 may have a rectangular shape. Similarly, in the cross-sectional view, each of the second focal points LS2 may have a rectangular shape.

The present invention may be applied to a manufacturing method of manufacturing a display panel by cutting a mother panel for a display panel. For example, the present invention may be applied to the manufacturing method for manufacturing a display panel for, for example, a high-resolution smartphone, a mobile phone, a smart pad, a smart watch, a tablet personal computer (PC), a vehicle navigation system, a television, a computer monitor, a notebook computer, and the like.

While the present invention has been described with reference to embodiments thereof, it will be understood by those of ordinary skill in the art that various changes in form and details may be made thereto without departing from the spirit and scope of the present invention.

What is claimed is:

1. A cutting method of a mother substrate for a display panel, the cutting method comprising:
   - irradiating a laser to the mother substrate at first intervals along a first cutting line overlapping dummy areas positioned adjacent to sides of each of display panel areas on the mother substrate;
   - irradiating the laser to the mother substrate at second intervals different from the first intervals along the first cutting line overlapping edge areas positioned adjacent to corner portions of each of the display panel areas,
   - wherein a size of each of the second intervals is less than a size of each of the first intervals, wherein, along the first cutting line, the laser is irradiated at the first intervals in the dummy areas and at the second intervals in the edge areas, wherein the edge areas are closer to the corner portions than the dummy areas;

wherein as the laser is irradiated to the first cutting line, a size of each of the first intervals is constant and a size of each of the second intervals is gradually reduced to 3 μm or less; and wherein the gradual reduction of the second intervals is coordinated with a gradual reduction of laser output energy in the edge areas such that both the interval size and the output energy decrease toward an intersection of the first cutting line and a second cutting line.

2. The cutting method of claim 1, further comprising:

irradiating the laser to the mother substrate at the first intervals along the second cutting line overlapping the dummy areas; and irradiating the laser to the mother substrate at the second intervals along the second cutting line overlapping the edge areas.

3. The cutting method of claim 2, wherein the dummy areas and the edge areas are alternately arranged along a first direction and a second direction crossing the first direction.

4. The cutting method of claim 2, wherein the first cutting line extends in a first direction, and the second cutting line extends in a second direction crossing the first direction.

5. The cutting method of claim 1, wherein a speed at which a size of each of the second intervals decreases as the laser is irradiated to the second cutting line is a same as a speed at which a size of each of the second intervals decreases as the laser is irradiated to the first cutting line.

6. The cutting method of claim 2, wherein a speed at which a size of each of the second intervals decreases as the laser is irradiated to the second cutting line is different from a speed at which a size of each of the second intervals decreases as the laser is irradiated to the first cutting line.

7. The cutting method of claim 2, wherein output energy of the laser emitted to the edge areas is less than output energy of the laser emitted to the dummy areas.

8. The cutting method of claim 7, wherein as the laser is irradiated to the first cutting line and the second cutting line, output energy of the laser irradiated to the dummy areas is constant and output energy of the laser irradiated to the edge areas is reduced.

9. The cutting method of claim 1, wherein the mother substrate includes a glass substrate or a plastic substrate.

10. The cutting method of claim 1, wherein the display panel includes a driving circuit and an emission circuit, and is disposed in each of the display panel areas.

11. The cutting method of claim 1, wherein the laser is a pulse laser.

12. The cutting method of claim 11, wherein the laser is a picosecond laser or a femtosecond laser.

13. The cutting method of claim 1, further comprising:

irradiating the laser to the mother substrate at the first intervals along a second cutting line overlapping the dummy areas; and irradiating the laser to the mother substrate at the first intervals along the second cutting line overlapping the edge areas.

14. The cutting method of claim 13, wherein as the laser is irradiated to the first cutting line, output energy of the laser irradiated to the edge areas is decreased, and wherein as the laser is irradiated to the second cutting line, output energy of the laser irradiated to the dummy areas and the edge areas is constant.

15. A cutting method of a mother substrate for a display panel, the cutting method comprising:

irradiating a laser to the mother substrate at second intervals along a first cutting line overlapping edge areas positioned adjacent to corner portions of each of display panel areas on the mother substrate;

irradiating the laser to the mother substrate at first intervals, different from the second intervals, or at the second intervals along a second cutting line overlapping the edge areas, wherein the first cutting line extends in a first direction, and the second cutting line extends in a second direction crossing the first direction;

irradiating the laser to the mother substrate at the first intervals along the first cutting line overlapping dummy areas positioned adjacent to sides of each of display panel areas on the mother substrate, wherein a size of each of the second intervals is less than a size of each of the first intervals, wherein, along the first cutting line, the laser is irradiated at the first intervals in the dummy areas and at the second intervals in the edge areas, wherein the edge areas are closer to the corner portions than the dummy areas;

wherein as the laser is irradiated to the first cutting line and the second cutting line, a size of each of the first intervals is constant and a size of each of the second intervals is gradually reduced to 3 μm or less; and wherein the gradual reduction of the second intervals is coordinated with a gradual reduction of laser output energy in the edge areas such that both the interval size and the output energy decrease toward an intersection of the first cutting line and the second cutting line.

16. The cutting method of claim 15, further comprising:

irradiating the laser to the mother substrate at the first intervals along the second cutting line overlapping the dummy areas.

* * * * *